United States Patent [19]

Conrad

[11] Patent Number: 4,607,197

[45] Date of Patent: Aug. 19, 1986

[54] LINEAR AND ROTARY ACTUATOR

[75] Inventor: Coleman W. Conrad, Whittier, Calif.

[73] Assignee: IMC Magnetics Corporation, Cerritos, Calif.

[21] Appl. No.: 120,320

[22] Filed: Feb. 11, 1980

Related U.S. Application Data

[63] Continuation of Ser. No. 896,827, Apr. 17, 1978.

[51] Int. Cl.⁴ ............................................. H02K 41/00
[52] U.S. Cl. ..................................... 318/115; 318/135; 310/12
[58] Field of Search ...................... 310/12–14; 318/116, 121, 135

[56] References Cited

U.S. PATENT DOCUMENTS

| 3,869,625 | 3/1975 | Sawyer | 310/12 |
| 4,197,488 | 4/1980 | Kaut | 318/11 J |

Primary Examiner—Donovan F. Duggan
Attorney, Agent, or Firm—Herzig & Yanny

[57] ABSTRACT

A linear and rotary electromagnetic device particularly adapted as a linear and rotary stepper or stepper motor. A cylindrical movable member or armature is provided which is mounted for both axial movement and for angular movement about its axis. The armature member has teeth on its surface formed in both axial rows and in circumferential alignment or rows. Stator means having poles with windings associated with the poles is provided, the stator means having a central opening in which the movable armature member is mounted for axial and angular movement. By energizing certain angularly spaced windings, the movable armature member may be caused to rotate. By energizing axially spaced windings, the movable member of armature can be caused to move axially. Simultaneous angular and axial movement is achieved by energizing appropriate windings.

6 Claims, 4 Drawing Figures

LINEAR AND ROTARY ACTUATOR

This is a continuation of application Ser. No. 896,827, filed Apr. 17, 1978.

BACKGROUND OF THE INVENTION

1. Field of the Invention

The field of the invention is that of electromagnetically actuated devices and more particularly actuators or motors of this type which are capable of both linear and rotary drive. The field of the invention is particularly or especially that of combined linear and rotary steppers or stepper motors.

2. Description of the Prior Art

Rotary stepper motors are widely known and used in various technical fields. The common form of such a stepper motor is one that operates in 200 discrete steps, the motor having a toothed motor and a stator with poles constructed appropriately for this number of steps. Examples of rotary stepper motors are in U.S. Patents such as U.S. Pat. Nos. 2,931.929; 2,982,872, and 3,434,014. Stepper motors that operate in steps are commonly used in connection with digital equipement wherein pulses are applied to the stepper motor which is used as an actuator.

Linear electromagnetic actuators are also known in the art, such devices embodying linearly movable armature members having teeth which are associated with a stator having poles and windings which are energizable to cause the movable member to move in the direction of its length. An example of such a device is illustrated in U.S. Pat. No. 3,894,275.

Devices are known in the prior which are combined rotary and linear motors or positioning mechanisms. Illustrative of such devices are the following U.S. Pat. Nos.: 3,394,295; 3,430,120; 3,441,819; 3,745,433; 3,851,196; and 3,889,165. The latter patent utilizes a cylindrical movable member which has teeth both on the inside and the outside associated with stators having windings so arranged as to produce both linear and rotary movement.

All of the prior art teachings referred to are lacking in the particular constructional improvements of the invention described in detail hereinafter. The prior art devices are lacking in specific effectiveness, capabilities, simplicity and compactness of constructional arrangements whereby to realize efficiency and effectiveness of both the linear and rotary movements. The nature of the improvements is brought out more clearly in the detailed description hereinafter of the preferred embodiment.

SUMMARY OF THE INVENTION

In a preferred exemplary form of the invention as described in detail herein, it takes the form of a linear and rotary stepper. An elongated cylindrical movable armature member is provided which is mounted for both axial and angular movement. This member is provided with teeth on its surface, the teeth being arranged in both axial rows and in circumferential aligned rows. Stator means are provided preferably in the form of a plurality of laminated stator members having radial poles with windings associated with individual poles. The construction provides both angularly spaced poles and axially spaced poles the relationship between the number of stator poles and the number of poles on the movable member being predetermined as described more in detail hereinafter.

The arrangement of the windings associated with the stator means is such that axially spaced windings can be energized to cause the movable member or armature to move axially to a position of minimum reluctance as between its teeth and the stator poles. The arrangement of windings in relation to the teeth on the movable member is further such that angularly spaced windings can be energized in a manner to cause the movable member to rotate about its axis. The device is capable of simultaneous axial and angular movement or so-called "diving" motion.

In light of the foregoing, the primary object of the invention is to realize and make available an electromagnetic actuator or actuating device capable of both axial and angular movement which has improved effectiveness from the standpoint both of construction and operating characteristics.

A further object is to realize a device as in the foregoing wherein the device has a movable member or armature having teeth on its surface including axially aligned teeth and angularly aligned teeth, the device having laminated stator means having poles and associated windings including angularly spaced poles and axially spaced poles.

A further object is to realize a device as in the foregoing objects which is capable of imparting angular movement to the rotary member, of imparting axial movement to the rotary member and imparting simultaneous combined angular and rotary movement.

Further objects and additional advantages will become apparent from the following detailed description and annexed drawings.

DESCRIPTION OF THE PREFERRED EMBODIMENT

Figure 1:
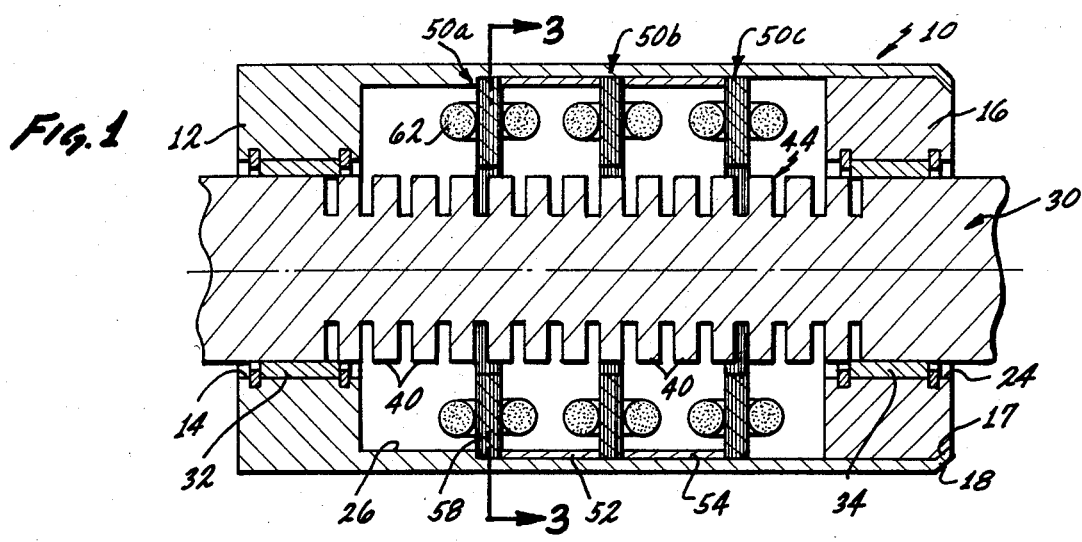
FIG. 1 is a cross-sectional view of a preferred form of the invention.

Referring now to the various figures of the drawing numeral 10 designates a cylindrical housing in which the components of the device are contained. As shown, the housing is cylindrical having an integral end part 12 which has an axial bore 14. Fitting in the other end is an end member 16 the diameter of which at the end is beveled as shown at 17 with the end part of the housing 10 swaged over the bevel as shown at 18. The end member 16 has an axial bore 24.

The housing 10 itself has a bore 26.

Coaxially mounted in the housing 10 is a movable member or armature 30 of magnetic material. The member 30 is mounted in linear bearings 32 and 34 positioned in the bores 14 and 24. Smooth surfaces of the movable member 30 fit inside the bearings so that the movable member 30 is free to move axially as well as angularly.

The surface of the member 30 is provided with teeth. The teeth include angularly arranged or aligned teeth such as the teeth as designated at 40 in FIG. 3. Six angularly spaced teeth are shown although the number could be different in accordance with teachings of the prior art in connection with known types of stepper motors.

Figure 2:
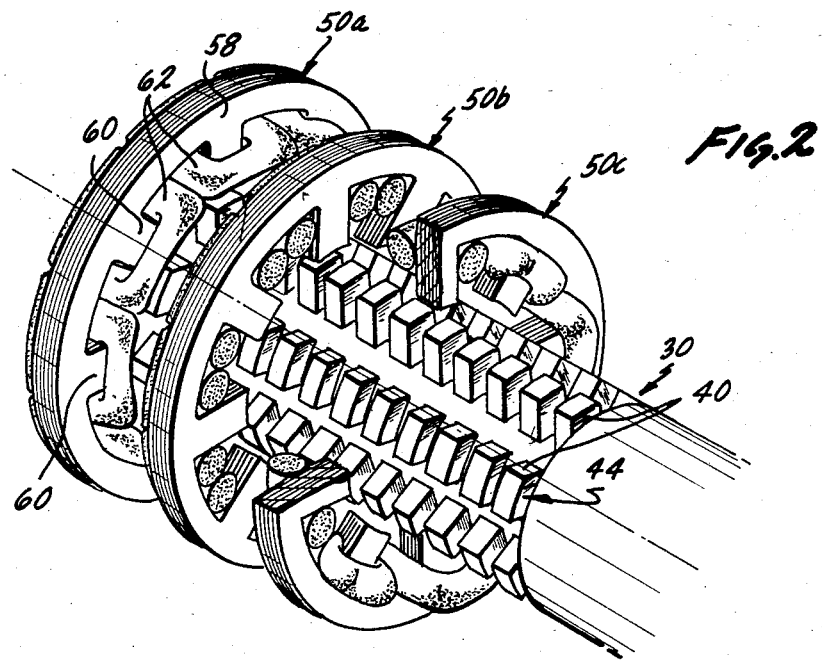
FIG. 2 is an isometric view illustrating the stator means and the armature or movable member of the device of FIG. 1.

There are a plurality of rows of circumferentially arranged angularly spaced teeth as may be seen in FIGS. 1 and 2. The circumferential rows are equally spaced axially so as to provide axial rows of teeth as well, one of such rows being designated by the numeral 44 in FIG. 2. A stator assembly with windings is provided as shown in the figures. In the exemplary form of the invention, the stator assembly includes a plurality of laminated stator cores as designated at 50a, 50b and 50c. Each of the stator core units is made up of magnetic laminated material. The stator cores are spaced axially as may be seen in FIG. 1 with cylindrical spacer members in between them as designated at 52 and 54 in FIG. 1.

Figure 3:
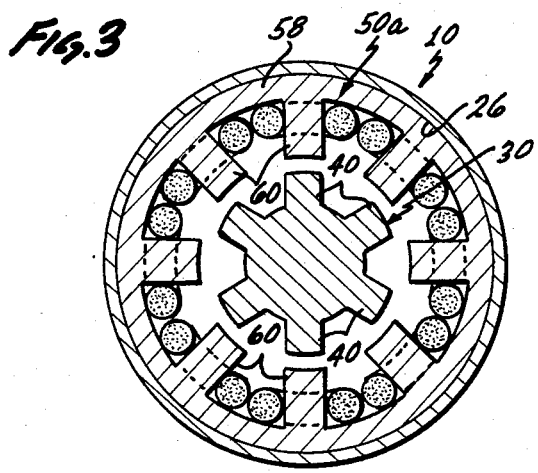
FIG. 3 is a cross-sectional view taken along the line 3—3 of FIG. 1.

The configuration of the stator unit 50a is shown more in detail in FIG. 3. It has a ring shaped part as designated at 58 with 8 radially positioned poles as designated at 60 in FIG. 3. Wound around each of the poles is a stator winding, as designated at 62 in the figures. While the exemplary embodiment is disclosed as having a predetermined number of stator poles and a predetermined number of angularly spaced teeth on the movable member or armature, it should be understood that different numbers and relationships between numbers of stator poles and teeth on the movable member may be provided. To the extent that the movable member can move angularly, it of course can be called a rotor. The relative number of stator poles and rotor teeth for purposes of angular movement can be provided following teachings of the prior art. Similarly, the axial spacing between teeth or that is rows of teeth in the circumferential direction may be varied considerably. The inner ends of the poles of the stator form an opening in which the movable member or armature is angularly and axially movable as illustrated in the drawings. The peripheral surfaces of the teeth on the movable member 30 move adjacent to the inner ends of the poles of the stator members.

As previously explained, the movable member is mounted in linear bearings to adapt it for both axial and angular movement.

Figure 4:
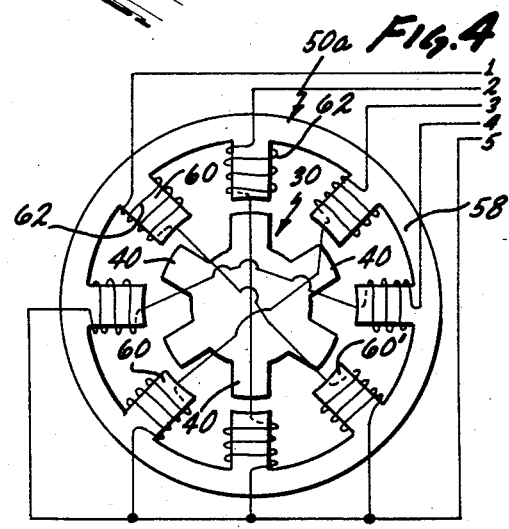
FIG. 4 is a schematic view showing the connections between windings.

FIG. 4 is a schematic diagram illustrating an exemplary from of basic circuitry for the windings of one stator. FIG. 4 illustrates the stator of FIG. 3. As may be observed the windings on diametrically opposite poles are connected in series. Terminals 1, 2, 3, and 4 are connected to four of the windings and terminal 5 connects to the other four windings in parallel. The circuitry for stators 50a and 50c corresponds to the circuitry schematically shown in FIG. 4. Thus in the exemplary embodiment there are fifteen electrical terminals for application of control pulses.

With respect to operation, reference will first be made to linear movements. As may be seen in FIG. 1 an angular row of teeth on the member 30 aligns with the ends of poles of the stator member which is the stator member 50b at only one position, the angular rows of teeth at all other positions being misaligned with reference to the inner ends of the pole of the stator members. The displacement of misaligned teeth is in the amount of one stepping movement. Windings opposite to each other are in series in a separate circuit constituting a phase. The principle of operation is that the movable member moves to a position of minimum reluctance as respects the air gaps between teeth on the movable member and the poles of the stators. Thus as may be seen if some or all of the windings associated with the stator core 50a are energized, the member 30 will move to the left to a position of minimum reluctance wherein a ring of angularly spaced teeth on the member 30 will align with the inner ends of the stator poles of the stator 50a. In a similar manner, member 30 can be caused to translate linearly in the other direction, that is to the right. As may be seen, the device is adapted to movement in increments, that is as a stepper in response to the application of electrical pulses to particular stator windings. Thus the device is adapted in digital systems both from the standpoint of receiving digital inputs and producing digital outputs. In practice, the windings would be controlled by a computer which would select the windings to be energized in order to realize the desired movements including combined angular and linear movement.

With reference to angular movements of the movable member 30, reference should be had to FIGS. 2, 3, and 4. The device also operates angularly on the principle of minimum reluctance. In the position of the device as shown in FIG. 3, and the schematic view FIG. 4 it will be observed that axial rows of teeth on opposite sides of the member 30 are aligned with stator poles. For producing angular movement stator windings associated with stator poles on opposite sides of the rotor 30 are energized. For example in FIGS. 3 and 4 the windings associated with the poles 60 and 60' could be energized causing the rotor 30 to rotate in a clockwise direction to bring teeth on the member 30 into alignment with the poles 60 and 60'. The movement is a stepping movement. Windings might be energized in this manner of only one of the stator assemblies 50 although corresponding windings of more than one of the stator assemblies might be energized at the same time to produce the angular stepping movement. The member 30 moves to the minimum reluctance position.

The angular movement and axial movement of the member 30 can be produced simultaneously, this type of movement being known as "diving" action.

Various types of driving circuits may be utilized including circuitry already known in the art. Circuitry for producing only angular movements provides pulses to predetermined stator windings as described in the foregoing, the application of pulses typically being such as to produce angular stepping movements. Axial movement can be produced by driving circuits of types arranged to apply pulses or otherwise to axially spaced windings as referred to in the foregoing.

For purposes of producing combined axial and angular movement, by way of example, diametrically opposed windings associated with stator 50a might be energized to cause the member 30 to assume a position of minimum reluctance in both the axial and angular directions. Thus the member 30 will align with energized poles, moving angularly and also moving axially to the position of minimum reluctance. Axial movements in the opposite direction could be obtained by energizing windings of that stator 50c. It will be understood of course that there might be any number of stator units with associated windings. Angular movements are realized by energizing selected windings of one or more selected stator units. Axial movements are realized by energizing windings of the appropriate stator unit and combined axial and angular movements are realized by selection of windings as described for producing both the angular movement and the axial movement.

In the manner described a computer can select terminals of the fifteen exemplary terminals as referred to in connection with FIG. 4 so that the moveable member can be positioned to a desired predetermined position by way of axial movements, angular movements, or combined movements.

A significant future of the invention is that limit or end switches are not required with the moveable member 30. Illustratively, for example, when the member 30 has moved into a position wherein it presents a smooth surface to the end of the poles of stator unit 50a, that stator unit could not cause it to move further. This characteristic also makes it possible to find or locate the position of the moveable member 30 when control is in response to a computer in the event and the computer should lose its memory. The position of the moveable member 30 is locatable in the manner described for example, that is by inserting pulses until it is in a position where it is no longer moveable in response to stator 50a. In the schematic illustration shown two more steps would be possible by control of stators 50b and 50c.

From the foregoing, those skilled in the art will understand the nature and construction of the invention and the manner in which it achieves and realizes the objectives set forth in the foregoing. Synergism is present in the combination in that in that movements of the movable member can be realized which cannot otherwise be realized by individual parts of the combination. Combined linear and rotary movements are different than either linear or rotary movements per se, and provide a function which can readily be made responsive to computer control not otherwise available.

The foregoing disclosure is representative of a preferred embodiment, it being realized that many equivalent variations are possible, particularly as respects the numbers of teeth angularily and axially, the relative numbers of poles on the stators, the relative positioning of the stators, etc. The foregoing disclosure is representative of the preferred embodiment, and it is to be interpreted in an illustrative rather than a limiting sense, the invention to be accorded the full scope of the claims appended hereto.

What is claimed is:

1. A linear and rotary stepping device including in combination, a first member having an axis and which is mounted to be movable angularly about its axis and to be movable axially thereof, said member having means formed on its surface which provide individual aligned angularly spaced teeth having end faces, said last means being constructed so that aligned individual axially spaced teeth having end faces are provided as well as angularly spaced teeth on the surface of the said member, stator means having groups of circumferentially spaced individual poles having end faces and including windings and having a circular central opening in which the movable member is disposed so that the teeth of the movable member can move adjacent to the poles of the stator means, the stator means including at least three of said groups of poles and windings which are spaced axially, the said stator means being constructed whereby energizing certain axially spaced stator windings, the movable member can be caused to move axially and by energizing selected stator windings that are angularly displaced from each other the said movable member is caused to rotate about its axis, the end faces of the said poles being adjacent the end faces of the teeth on the said movable member, all of said faces forming smooth uninterrupted surfaces.

2. A device as in claim 1 wherein the capability of simultaneously imparting axial and angular movement to the movable member is provided by energizing certain windings that are axially spaced from each other and by energizing certain windings that are angularly spaced from each other.

3. A device as in claim 1 wherein the said teeth on the movable member are arranged in rows which include axial rows and also circumferential rows in which the teeth are angularly spaced.

4. A device as in claim 1 wherein the number of angularly spaced stator poles bears a predetermined relationship of the number of angularly spaced teeth on the moveable member at any given position thereon.

5. A device as in claim 1, including linear end bearings, the first member having smooth end parts journalled in the said end bearings whereby when an end part of the first member becomes positioned opposite the stator poles, movement is discontinued.

6. A device as in claim 1, wherein the device includes a housing having a cylindrical bore, each of said groups of poles comprising an individual circular stator member having inwardly extending poles and being of a size to fit into the said bore, there being spacer members between the individual stator members.

* * * * *